United States Patent [19]
Cuingnet

[11] Patent Number: 5,973,277
[45] Date of Patent: Oct. 26, 1999

[54] ELECTRICAL CONTROL SIGNALING DEVICE WITH A FASTENING BASEPLATE

[75] Inventor: Patrick Cuingnet, Soyaux, France

[73] Assignee: Schneider Electric SA, Boulogne Billancourt, France

[21] Appl. No.: 08/776,586

[22] PCT Filed: Jun. 5, 1996

[86] PCT No.: PCT/FR96/00842

§ 371 Date: Feb. 5, 1997

§ 102(e) Date: Feb. 5, 1997

[87] PCT Pub. No.: WO96/41406

PCT Pub. Date: Dec. 19, 1996

[30] Foreign Application Priority Data

Jun. 7, 1995 [FR] France ................................. 95 06803

[51] Int. Cl.[6] .................................................... H01H 9/02
[52] U.S. Cl. ........................................... 200/296; 248/27.1
[58] Field of Search ................................... 200/293–307, 200/341–345, 314; 248/27.1, 27.3

[56] References Cited

FOREIGN PATENT DOCUMENTS

WO91/07790  5/1991  France .

*Primary Examiner*—Michael L. Gellner
*Assistant Examiner*—Nhung Nguyen
*Attorney, Agent, or Firm*—Oblon, Spivak, McClelland, Maier & Neustadt, P.C.

[57] ABSTRACT

An electrical control or signaling device such as a push button or lamp includes a body which is fixed on a support wall and a baseplate for receiving contact blocks. The baseplate 20 houses a slide 30 and a manipulation screw having arms 33 and 34, acts on the slide 30 to translate the slide. The arms 33 and 34 have sharp edges or points (A1, A2) which act against the support wall and are displaced within a plane (P3) which is perpendicular to the plane S of the wall.

8 Claims, 1 Drawing Sheet

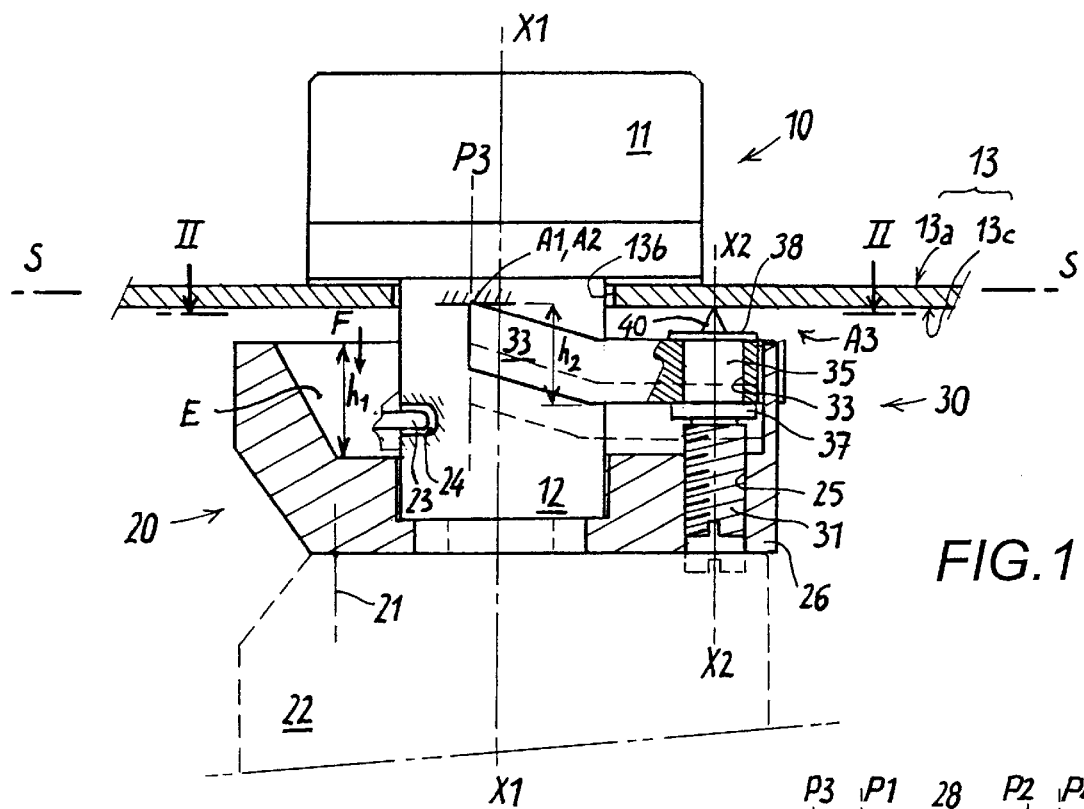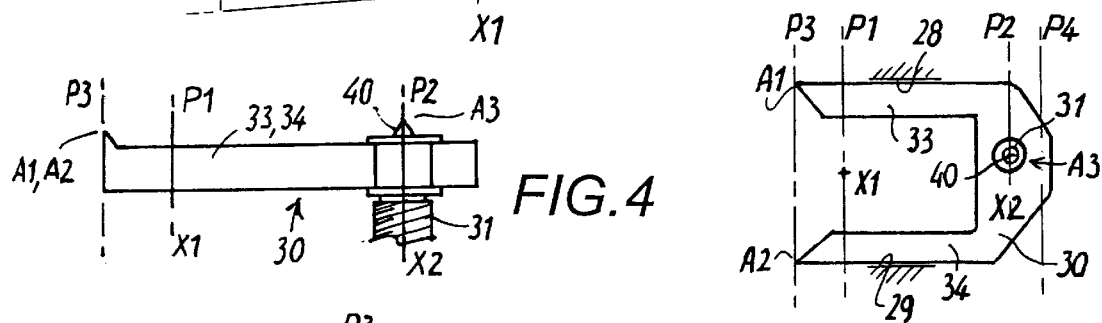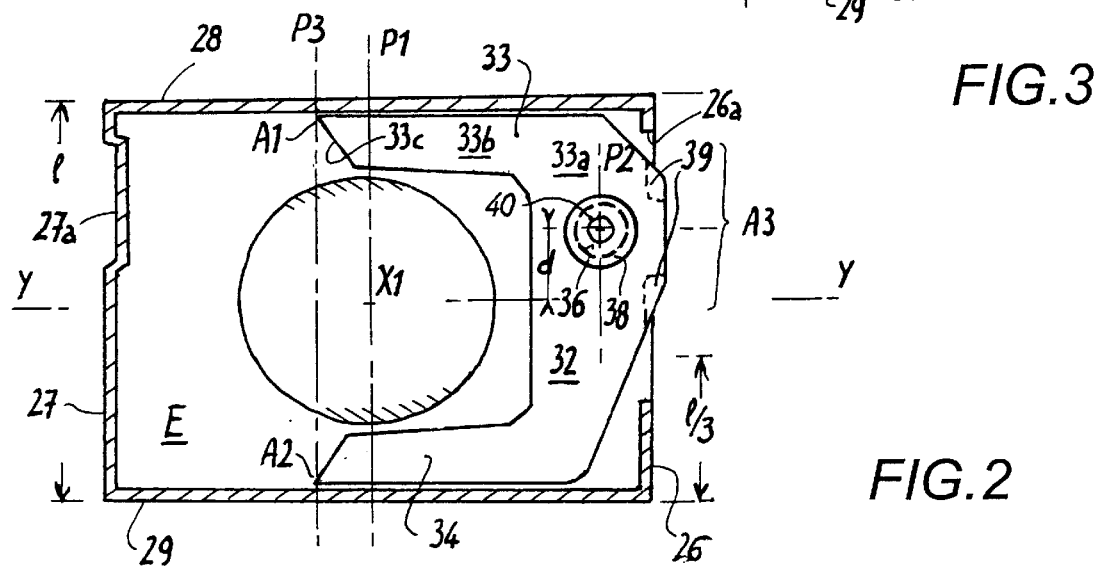
FIG. 1
FIG. 4
FIG. 3
FIG. 2

ELECTRICAL CONTROL SIGNALING DEVICE WITH A FASTENING BASEPLATE

BACKGROUND OF THE INVENTION

FIELD OF THE INVENTION

This invention relates to an electrical control or signalling device such as a push button or lamp or analogous device including a dialogue element intended to be fixed on one side of a support wall, this element being extended by a tubular part to be engaged in an orifice in the wall in order to receive, from the other side of the wall, means of attachment to the wall and an electrical unit such as a switch contact block or an auxiliary unit.

DISCUSSION OF BACKGROUND

The fixing means mentioned above can include a nut screwed onto a thread on the tubular part of the device; if one wishes the attachment to be especially strong and durable, it is generally preferable to benefit from the attachment of a baseplate supporting the contact blocks to the tubular part in order to fix to this baseplate anchoring means such as a tapered screw or pivoting anchoring arms that can be displaced by means of a screw.

Such a device, described in patent EP-452 462, includes a pivoting lever, with a forked shape. It has the advantage of being simple and robust and of facilitating the operations of attachment to the support wall and disassembly, the operator only, in effect, having to manipulate a single screw.

However, the pivoting lever mechanism used in this way has some disadvantages. If it is a lever of the first kind, the clamping operation is rapid since the fitter only makes a small angular rotational movement to the manipulation screw, but the transmitted load is reduced in accordance with the ratio of the lever arms; if it is a lever of the second kind, the transmitted load is increased, but this occurs to the detriment of the amount of rotational movement made to the screw and hence on the clamping time. Furthermore, the mechanical efficiency is decreased by loss of load at the lever pivots.

Finally, when such a push button is mounted on walls of various thicknesses, the anchoring arms of the lever are applied to points on this wall located at variable distances from the axis of the push button. The result is variable positioning of the clamping load that is not controlled by the couple exerted on the push button.

SUMMARY OF THE INVENTION

The aim of the invention is to avoid the disadvantages described whilst guaranteeing to the fitter a firm clamping exerted by means of a single screw in a manner that is independent of variations in the mounting dimensions.

A further aim is to ensure the transmission of load with satisfactory efficiency, in conjunction with an angular travel during manipulation (that is a clamping time) that is as low as possible, with the help of simple devices taking up little space.

According to the invention, the detachable baseplate on the tubular part of the body of the device includes a slide acted upon by a manipulation screw and including anchoring arms which surround the tubular part and which can anchor themselves under the support wall; the slide is linked to the screw and is guided in translation by guide surfaces on the baseplate or on the tubular part and the arms of the slide each have a sharp edge or anchoring point defining a support line which can be displaced within a plane perpendicular to the support plane.

The mounting of the device on the support wall can therefore be carried out with compromise sought for between the transmitted load and the clamping time, whilst keeping the support at a specified distance from the axis of the tubular part whatever the thickness of the wall.

Advantageously, it is provided on the slide, on the side of the orifice for passage of the manipulation screw facing the anchoring edges, a complementary support area which defines with the line previously mentioned, a support plane parallel to the support plane and which can be displaced parallel to it.

BRIEF DESCRIPTION OF THE DRAWINGS

The invention will be better understood on reading the description which has been made below, with reference to the Figures, of a preferred embodiment.

FIG. 1 is a front elevation and cross-sectional view of a push button fixed to a thin mounting wall.

FIG. 2 is a sectional view of the baseplate, along the plane II—II

FIG. 3 diagramatically shows a top view of the slide

FIG. 4 shows a variant of the slide in elevation

DETAILED DESCRIPTION OF THE PREFERRED EMBODIMENT

The electrical control or signalling apparatus illustrated in FIG. 1 is a push button including a body 10 fitted with a head 11 and a tubular part 12 with axis X1 and a diameter less than the width of the head. This is positioned, possibly with a seal and/or a label which have not been shown, on an external face 13a of a thin support wall 13 which is generally metal. The wall 13 is oriented along a plane S and may form part of an enclosure such as a console, a cabinet, . . . ; it includes an orifice 13b in which the tubular part 12 of the push button engages with clearance.

A baseplate 20 of generally rectangular shape is linked to the push button from the inside face of the wall 13 in order to support moveably, using fixing devices 21, which will not be described, detachable electrical units 22 such as switch contact blocks or auxiliary units. The baseplate is, on the one hand positioned on the tubular part 12 and is rigidly fixed to it by shaped elements 23, 24 that work together to prevent the baseplate being taken out in direction X1; the baseplate is, on the other hand anchored against the inside face 13c of the wall 13 by means of a slide 30 acted upon by a single manipulation screw 31.

The screw 31 engages via its thread with the tapped hole 25 provided on one side of the baseplate 20, with a small surface 26 of length 1 of the baseplate. The axis X2 of the screw is parallel to X1 and is offset by a distance d with respect to a median plane Y of the baseplate, this distance d being determined so as to allow mounting or gaining access to any one of three contact blocks 22 of width $\frac{1}{3}$ fixed under the baseplate facing wall 26, the baseplate of rectangular shape has a small wall 27 and, between walls 26, 27, large walls 28, 29 in a way that defines a void space E of a height h1 approximately equal or greater than the total height h2 of the slide. The slide is a solid cut out metal component that may or may not be bent, in the general shape of a U that includes a conductor 32 and two arms 33, 34 that surround the tubular part 12 of the push button.

The manipulation screw 31 has a smooth part 35 housed with clearance just sufficient to allow it to rotate about X2 without tilting within a drilled or bored hole 36 made in the conductor 32 of the slide. A washer or collar 37 is provided on the screw between its threaded and smooth parts in order to transmit the clamping load to the slide. The smooth part 35 of the screw can be held in, for example by a flange 38 created by stamping or crimping, by a washer or other analogous element on the top face of the conductor 32. In another more complicated embodiment, the screw can be immobilised in translation in the baseplate and can be assembled in a tapped hole in the slide.

Each arm 33, 34 of the slide has, for example, a straight part such as 33a, perpendicular to the plane P1 and to the parallel plane P2 (passing through X2) and a slightly inclined part 33b forming one part of the fork. The arms can also be straight. In all cases, they include towards their free end a sharp edge or Points A1, A2 defined by a cut face 33c so as to define a support edgeline A1, A2 parallel to the plane S of the support and which can be displaced under the effect of the actuation of the screw 31 in a plane P3 parallel to P1, perpendicular to the plane S and located, with respect to the axis X1 of the tubular part, on the opposite side of axis X2 of the manipulation screw.

An extra support area A3 is provided on the top face of the slide. This area can be located either on the side of the orifice 36 which is opposite to the support points A1, A2, or on the axis of the orifice 36. In the first case, it is constituted by a support point (39) or an anchoring point or indeed, as is illustrated in dashes on FIG. 2 by two points 39, arranged on the edge of the slide on the side of the wall 26. When there are support points, they can be flush with a level offset by a small clearance with respect to the level of A1, A2. Preferably, the area of support A3 is constituted by a point 40 provided at the top end of the screw 31 on axis X2. The area A3 is located approximately at the level of A1, A2 in such a way that A1, A2, A3 determine a support plane parallel or approximately parallel to the plane S, that can be displaced perpendicular to it and which determine a resultant load as close as possible to the axis X1 of the push button, taking into account the necessary constraints of geometry and of the strength of the slide. The presence of the support area A3 allows the stress on the arms 33, 34 of the slide to be decreased and because of that allows its dimensions and the space it occupies to be reduced. It should be noted that the positioning of area A3 at the level of plane P2 or beyond it with respect to A1 and A2 reduces the frictional forces of the screw and hence the manipulation load.

The slide can be housed completely within the rectangular shape of the baseplate; it can nevertheless, as indicated in FIG. 2, extend beyond an opening 26a in the wall 26, the opposite small wall 27 being provided with a corresponding recess 27a in order to allow the lengthwise juxtaposition of the push buttons fitted with their baseplates. The distance d2 between the support line A1, A2—or plane P3—and plane P2 is equal to or two times greater than, and is for example, of the order of four times the distance d3 between P2 and plane P4 passing through A3.

In the embodiment variation in FIG. 4, the arms 33, 34 of the slide 30 extend perpendicularly to P1 and end with points A1, A2 approximately at the same height as point 40 of screw 31.

The device described operates in the following manner. The fitter fits the tubular part 12 of the push button into the orifice 13b of the wall 13, then fits the baseplate 20 onto the tubular part 12 until elements 23, 24 grip or click into place. The slide 30 is then brought from its initial withdrawn position indicated with dashes in FIG. 1 to the clamping position indicated in solid lines, by turning the screw 31. During this movement, the slide is guided by the external surfaces of its arms 33, 34 against the internal surfaces of the walls 28, 29 of the baseplate and the points A1, A2 move strictly within plane P3. The points A1, A2 and the point 40 of area A3 are applied against the face 13c of the support and the slight sinking of the points into the wall 13 is absorbed by the clearance of the thread of the screw 31 and of the tapped hole 25.

I claim:

1. An electrical control device, comprising:

a body having a head to be fixed on an external surface of a support wall, said body also being provided with a tubular part to be introduced into an orifice of said support wall;

a baseplate for movably receiving an electrical unit including a stop device for making said baseplate integral with said tubular part;

wherein said baseplate includes a slide having attachment arms surrounding the tubular part and a manipulation screw which acts upon said slide to provide a force on an internal surface of the support wall;

wherein said slide is contacted with said screw and guided in translation through guide surfaces on said baseplate in order to provide a displacement of the slide parallel to an axis of said tubular part; and wherein said attachment arms each include support points defining a support line displaced within a plane perpendicular to a plane of the support wall when said manipulation screw acts upon said slide to apply said force to the internal surface of said support wall.

2. A device according to claim 1, characterised in that the displacement plane (P3) of the support line (A1, A2) is located, with respect to the axis (X1) of the tubular part on the opposite side of the axis (X2) of the manipulation screw.

3. A device according to claim 1, characterised in that the slide has a conductor provided with the orifice through which the manipulation screw passes, and on the side of this orifice which is opposite to the support line (A1, A2), a complementary support area (A3) which defines, with the support line, a support plane, approximately parallel to the plane (S) of the support wall and which can be displaced perpendicular to it.

4. A device according to claim 3, characterised in that the complementary support area (A3) includes point located at one end of the manipulation screw.

5. A device according to claim 4, characterised in that the anchoring points (A1, A2) of the arms and the point of the complementary support area (A3) have approximately the same height.

6. A device according to claim 1, characterised in that the baseplate has a void space (E) of a height (h1) approximately equal or greater than the total height (h2) of the slide.

7. A device according to claim 6, characterised by the fact that the slide is a solid cut out metal component.

8. A device according to claim 1, characterised by the fact that the manipulation screw has a threaded part which works together with a tapped hole in the baseplate and a smooth part which is fixed in translation and is able to turn without tilting in a bore in the slide and that between the smooth part and the threaded part there is a collar applied to the slide.

* * * * *